United States Patent [19]

Murakami et al.

[11] Patent Number: 5,307,076
[45] Date of Patent: Apr. 26, 1994

[54] WINDOW GLASS ANTENNA DEVICE

[75] Inventors: Harunori Murakami; Yuji Baba, both of Ibaraki, Japan

[73] Assignee: Nippon Sheet Glass Co., Ltd., Japan

[21] Appl. No.: 971,456

[22] Filed: Nov. 4, 1992

[30] Foreign Application Priority Data

Nov. 5, 1991 [JP] Japan .................................. 3-99101

[51] Int. Cl.⁵ .......................... H01Q 1/02; H01Q 1/32
[52] U.S. Cl. ..................................... 343/704; 343/713
[58] Field of Search ....................... 343/704, 713, 904; H01Q 1/32, 1/02

[56] References Cited

U.S. PATENT DOCUMENTS

| | | | |
|---|---|---|---|
| 3,484,583 | 12/1969 | Shaw, Jr. | 343/704 |
| 3,484,584 | 12/1969 | Shaw, Jr. | 343/704 |
| 5,017,935 | 5/1991 | Sakurai et al. | 343/713 |

FOREIGN PATENT DOCUMENTS

| | | |
|---|---|---|
| 0358529 | 3/1990 | European Pat. Off. |
| 4125999 | 10/1992 | Fed. Rep. of Germany |
| 63-129307 | 8/1988 | Japan |
| 2-082701 | 3/1990 | Japan |

Primary Examiner—Donald Hajec
Assistant Examiner—Hoanganh Le
Attorney, Agent, or Firm—Merchant, Gould, Smith, Edell, Welter & Schmidt

[57] ABSTRACT

A window glass antenna device is combined with a laminated window glass panel, such as a rear window glass panel of an automobile, which has a pair of inner and outer glass layers bonded to each other. The window glass antenna device has, as antenna elements, a plurality of defroster heater wires disposed between the glass layers. A pair of spaced first and second bus bars is disposed between the glass layers, the first bus bar electrically interconnecting first ends of the defroster heater wires and the second bus bar electrically interconnecting second ends of the defroster heater wires. A first electrode is disposed on an outer surface of the inner glass layer and joined to the second bus bar for supplying electric energy to heat the defroster heater wires, and a second electrode is disposed on the outer surface of the inner glass layer in confronting relationship to the first bus bar. The first bus bar and the second electrode jointly provide a capacitor for supplying a radio signal received by the defroster heater wires.

13 Claims, 5 Drawing Sheets

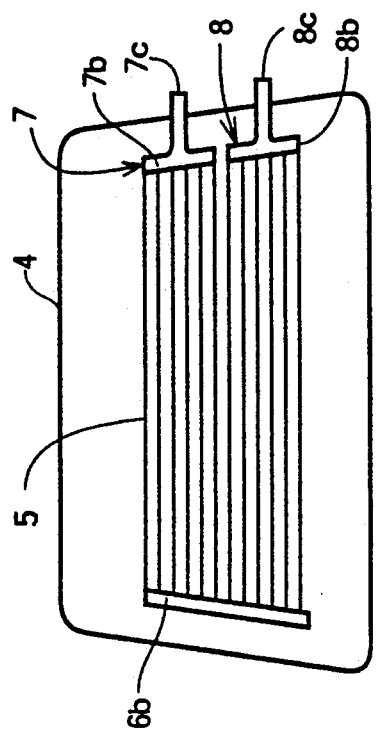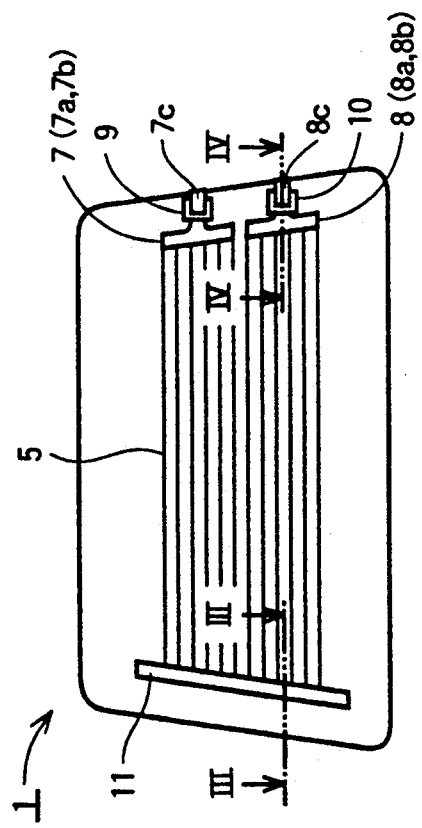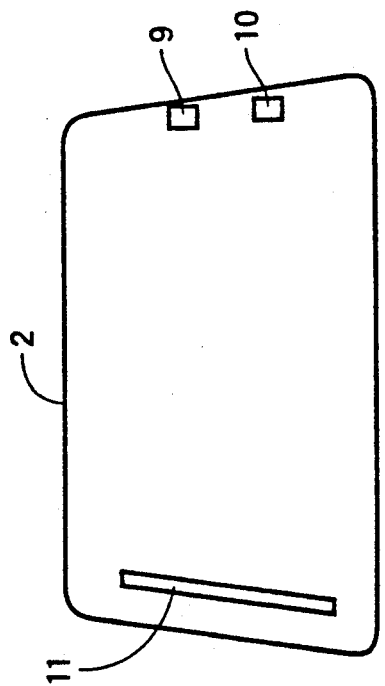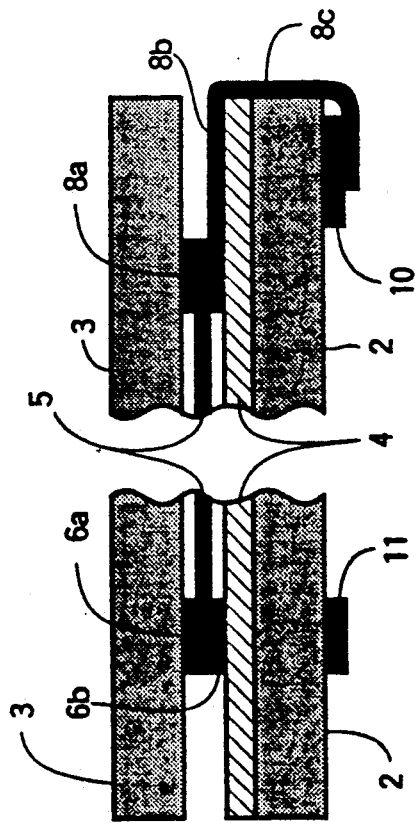

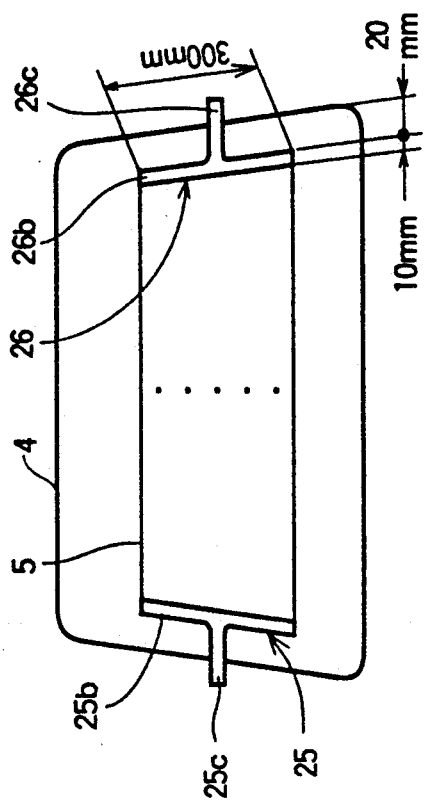
FIG.7
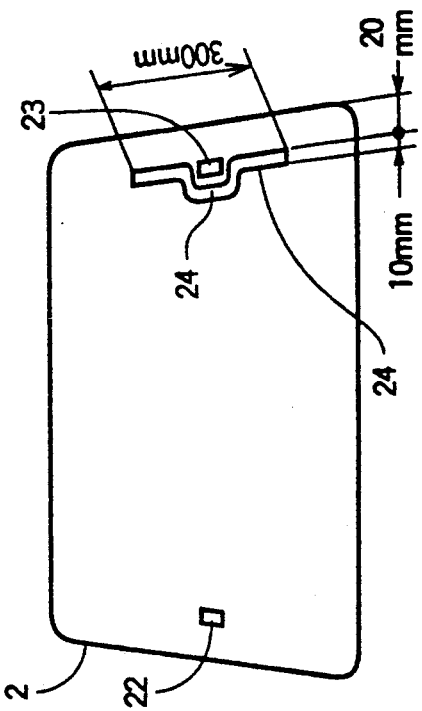
FIG.10
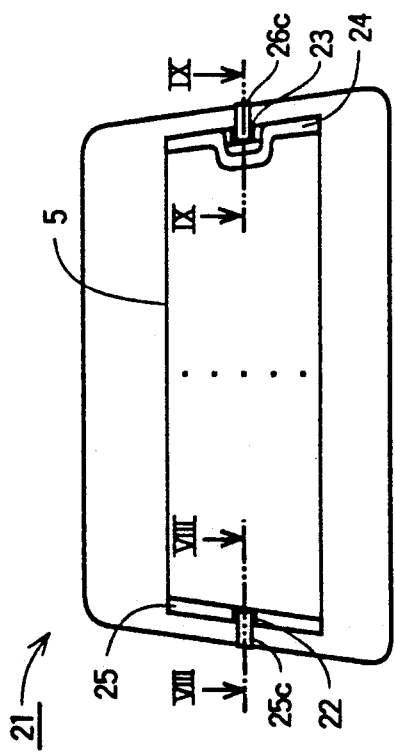
FIG.8
FIG.9
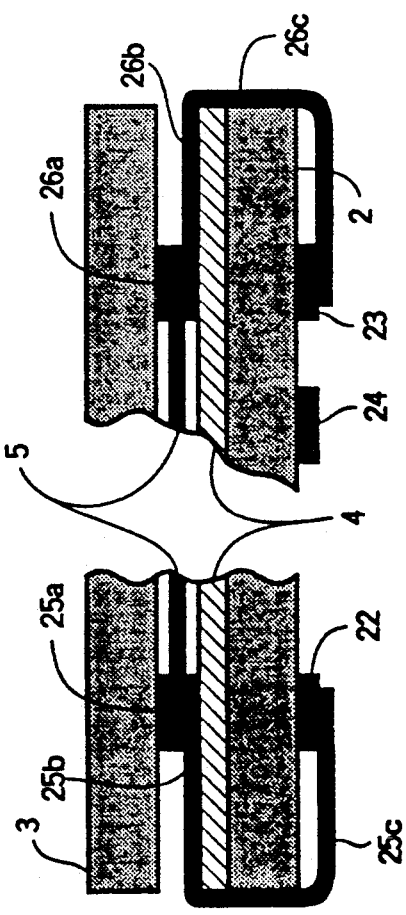
FIG.11

WINDOW GLASS ANTENNA DEVICE

BACKGROUND OF THE INVENTION

1. Field of the Invention

The present invention relates to a window glass antenna device for use on an automobile, for example, and more particularly to a window glass antenna device having an antenna in the form of defroster heater wires in a window glass panel of an automobile.

2. Description of the Relevant Art

Japanese laid-open utility model publication No. 63-129307 discloses a window glass antenna device having an antenna which comprises a plurality of defroster heater wires in a window glass panel of an automobile. The defroster heater wires have respective ends electrically connected to a bus bar, from which received radio signals can be transmitted through a DC blocking capacitor.

Since the defroster heater wires are used as antenna elements, the DC blocking capacitor is required to block a current which is supplied to heat the defroster heater wires.

FIG. 1 of the accompanying drawings shows such a prior window glass antenna device with a plurality of defroster heater wires as antenna elements. The illustrated conventional window glass antenna device, generally denoted at 100, has defroster heater wires 104 having ends connected to bus bars 101, 102 and opposite ends connected to a bus bar 103. The bus bar 103 is connected through a DC blocking capacitor 110 to a radio receiver (not shown). The bus bars 101, 102 are connected respectively to choke coils 106, 105 that are connected to respective terminals of a capacitor 107. The capacitor 107 is connected through a switch 108 to a DC power supply 109. When the switch 108 is closed, DC electric energy is supplied from the DC power supply 109 through the switch 108 and the choke coils 105, 106 to the defroster heater wires 104. The choke coils 105, 106 serve to provide a sufficiently high impedance in the frequency range of received radio waves as viewed from the defroster heater wires 104. The capacitor 107 serves to prevent power supply noises from being transmitted to the defroster heater wires 104.

In the case where the defroster heater wires 104 are disposed between glass layers of a laminated window glass panel 111, which is typically a rear window glass panel, it is necessary that the bus bars 101, 102, 103 be connected to outer terminals through copper foil or the like. However, the process of manufacturing such a window glass antenna device is complex and time-consuming because connecting the bus bars 101, 102, 103 to outer terminals through copper foil or the like requires a number of manufacturing steps.

SUMMARY OF THE INVENTION

It is therefore an object of the present invention to provide a window glass antenna device having defroster heater wires as antenna elements, which antenna device can be manufactured relatively simply and can supply radio signals that have been received or are to be transmitted without a discrete DC blocking capacitor.

According to the present invention, there is provided a window glass antenna device comprising a laminated window glass panel having an inner surface and an outer surface, a plurality of defroster heater wires disposed on the inner surface and having first and second ends, a bus bar disposed on the inner surface and electrically interconnecting the first ends of the defroster heater wires, and an electrode disposed on the outer surface in confronting relationship to the bus bar, the bus bar and the electrode jointly providing a capacitor for supplying a radio signal received by the defroster heater wires.

According to the present invention, there is also provided a window glass antenna device comprising a laminated window glass panel having a pair of glass layers bonded to each other, a plurality of defroster heater wires disposed between the glass layers and having first and second ends, a pair of spaced bus bars disposed between the glass layers, one of the bus bars electrically interconnecting the first ends of the defroster heater wires and the other of the bus bars electrically interconnecting the second ends of the defroster heater wires, a first electrode disposed on an outer surface of one of the glass layers and joined to the other bus bar for supplying electric energy to heat the defroster heater wires, and a second electrode disposed on the outer surface of the one of the glass layers in confronting relationship to the one of the bus bars, the one of the bus bars and the second electrode jointly providing a capacitor for supplying a radio signal received by the defroster heater wires.

Each of the defroster heater wires has a diameter less than 0.1 mm. Preferably, each of the defroster heater wires has a diameter ranging from 0.04 to 0.05 mm. The window glass antenna device further comprises an intermediate film disposed on the inner surface of the one of the glass layers.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a plan view of a window glass antenna device according to an embodiment of the present invention;

FIG. 3 is an enlarged cross-sectional view taken along line III—III of FIG. 2;

FIG. 4 is an enlarged cross-sectional view taken along line IV—IV of FIG. 2;

FIG. 5 is a plan view of an intermediate film of the window glass antenna device shown in FIG. 2;

FIG. 6 is a plan view of electrodes on an inner glass layer of the window glass antenna device shown in FIG. 2;

FIG. 7 is a plan view of a window glass antenna device according to another embodiment of the present invention;

FIG. 8 is an enlarged cross-sectional view taken along line VIII—VIII of FIG. 7;

FIG. 9 is an enlarged cross-sectional view taken along line IX—IX of FIG. 7;

FIG. 10 is a plan view of an intermediate film of the window glass antenna device shown in FIG. 7;

FIG. 11 is a plan view of electrodes on an inner glass layer of the window glass antenna device shown in FIG. 7;

DETAILED DESCRIPTION OF THE PREFERRED EMBODIMENTS

Figure 1:
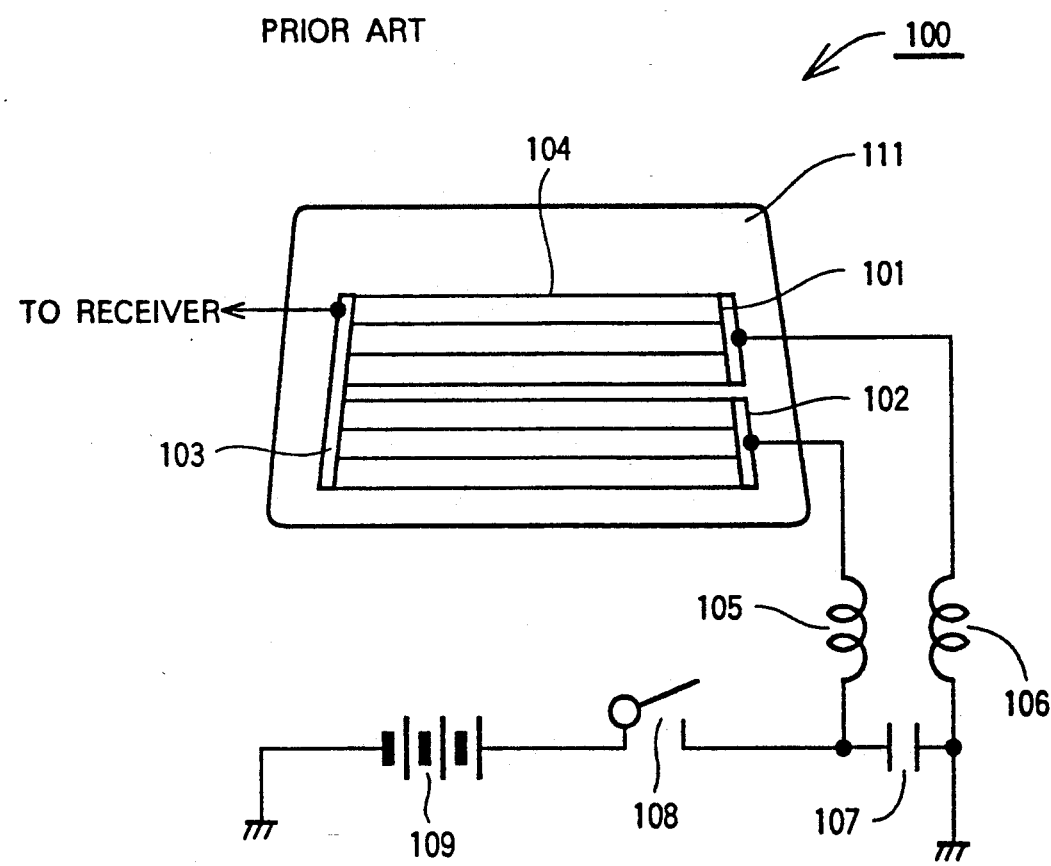
FIG. 1 is a schematic view of a conventional window glass antenna device.

The terms "inner" and "outer" used herein are meant to indicate directions with respect to the geometrical center of the passenger compartment of an automobile.

FIGS. 2 through 6 show a window glass antenna device according to an embodiment of the present invention.

As shown in FIGS. 2, 3, and 4, the window glass antenna device, generally designated by the reference numeral 1, is combined with an automobile window glass panel, such as a rear window glass panel, which comprises an inner glass layer 2 and an outer glass layer 3. The inner and outer glass layers 2, 3 are positioned so as to face inwardly and outwardly, respectively, with respect to the passenger compartment of an automobile. The window glass antenna device 1 comprises a transparent intermediate film and a plurality of horizontal defroster heater wires 5 which are positioned between the inner glass layer 2 and the outer glass layer 3. The defroster heater wires 5 serve as respective antenna elements.

The intermediate film 4 is attached to an outer surface of the inner glass layer 2, as shown in FIG. 3.

As shown in FIG. 5, the window glass antenna device 1 also includes a substantially vertical bus bar 6 positioned in a left end portion of the window glass panel and electrically interconnecting left ends of the defroster heater wires 5, and a pair of substantially vertical bus bars 7, 8 positioned in a right end portion of the window glass panel and electrically interconnecting right ends of the defroster heater wires 5 that are divided into upper and lower groups.

As shown in FIG. 3, the bus bar 6 comprises a pair of rectangular copper foil layers 6a, 6b attached respectively to an inner surface of the outer glass layer 3 and an outer surface of the intermediate film 4. The left ends of the defroster heater wires 5 are sandwiched between the copper foil layers 6a, 6b in electric contact therewith.

As shown in FIGS. 4 and 5, the bus bars 7, 8 comprise rectangular copper foil layers 7a, 7b, respectively, and rectangular copper foil layers 8a, 8b, respectively, the copper foil layers 7b, 8b having respective horizontal leader terminals 7c, 8c. The right ends of the defroster heater wires 5 are sandwiched between the copper foil layers 7a, 7b and 8a, 8b in electric contact therewith. The horizontal leader terminals 7c, 8c project outwardly from the window glass panel, and are folded around a right vertical edge of the inner glass layer 2 over the inner surface thereof, as shown in FIG. 4. The folded ends of the horizontal leader terminals 7c, 8c are fixed to respective electrodes 9, 10 disposed on the inner surface of the inner glass layer 2, as shown in FIGS. 2 and 4. DC electric energy is supplied from a heater power supply (not shown) to the defroster heater wires 5 through the electrodes 9, 10. Specifically, a direct current flows from the heater power supply through the electrode 9 (or 10) to the lower group of defroster heater wires 5 and then through the bus bar 6 to the upper group of defroster heater wires 5, after which the current flows from the electrode 10 (or 9) back to the heater power supply.

Each of the defroster heater wires 5 comprises a tungsten wire having a diameter ranging from 0.04 to 0.05 mm. The illustrated window glass antenna device has 12 defroster heater wires 5 as antenna elements. However, the window glass antenna device may have any number of defroster heater wires 5 as antenna elements.

In FIGS. 3 and 4, the inner surface of the outer glass layer 3 and the outer surface of the intermediate film 4 are shown as being spaced from each other. Actually, however, the inner surface of the outer glass layer 3 and the outer surface of the intermediate film 4 are bonded to each other with the copper foil layers 6a, 6b, 7a, 7b, 8a, 8b and the defroster heater wires 5 being pressed into the intermediate film 4.

As shown in FIGS. 2, 3, and 6, a vertical rectangular electrode 11 is attached to the inner surface of the inner glass layer 2 in aligned confronting relationship to the bus bar 6. The electrode 11 serves to supply radio signals that are received by the defroster heater wires 5 to a radio receiver (not shown). The bus bar 6 and the electrode 11 jointly provide a capacitor with the bus bar 6 serving as a first electrode and the electrode 11 as a second electrode. Therefore, radio signals received by the defroster heater wires 5 are transmitted through the capacitor to the radio receiver.

FIGS. 7 through 11 illustrate a window glass antenna device according to another embodiment of the present invention. Those parts shown in FIGS. 7 through 11 which are identical to those shown in FIGS. 2 through 6 are denoted by identical reference characters, and will not be described in detail below.

The window glass antenna device, generally designated by the reference numeral 21, has a pair of substantially vertical bus bars 25, 26 positioned respectively in left and right end portions of the window glass panel and connected to the left and right ends, respectively, of the defroster heater wires 5. The bus bar 25 comprises a pair of rectangular copper foil layers 25a, 25b attached respectively to the inner surface of the outer glass layer 3 and the outer surface of the intermediate film 4. Similarly, the bus bar 26 comprises a pair of rectangular copper foil layers 26a, 26b attached respectively to the inner surface of the outer glass layer 3 and the outer surface of the intermediate film 4. The copper foil layers 25b, 26b have horizontal leader terminals 25c, 26c, respectively, that are folded around respective left and right vertical edges of the inner glass layer 2 over the inner surface thereof, as shown in FIGS. 8 and 9. The folded ends of the horizontal leader terminals 25c, 26c are fixed to respective electrodes 22, 23 disposed on the inner surface of the inner glass layer 2, as shown in FIGS. 7, 8, and 9. DC electric energy is supplied from a heater power supply (not shown) to the defroster heater wires 5 through the electrodes 22, 23. Specifically, a direct current flows from the heater power supply through the electrode 22 (or 23) to the defroster heater wires 5 and then to electrode 23 (or 22), after which the current flows back to the heater power supply.

As shown in FIGS. 7, 9, and 11, a substantially vertical rectangular electrode 24 is attached to the inner surface of the inner glass layer 2 in substantial alignment with the bus bar 26 in confronting relationship thereto, the electrode 24 having a central C-shaped portion 24a extending around the electrode 23. The electrode 24 serves to supply radio signals that are received by the defroster heater wires 5 to a radio receiver (not shown). The bus bar 26 and the electrode 24 jointly provide a capacitor with the bus bar 26 serving as a first electrode and the electrode 24 as a second electrode. Therefore, radio signals received by the defroster heater wires 5 are transmitted through the capacitor to the radio receiver.

Figure 12:
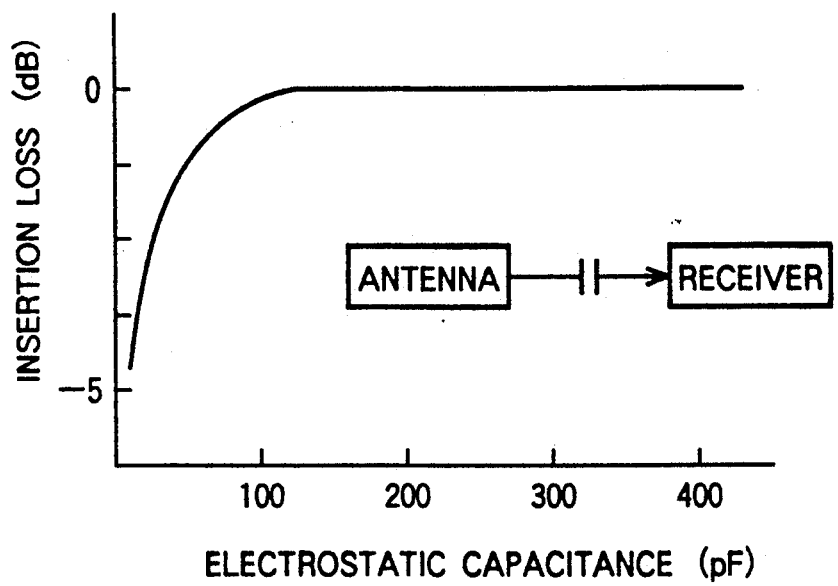
FIG. 12 is a graph showing the relationship between the electrostatic capacitance of a capacitor and an insertion loss.

FIG. 12 shows the relationship between the electrostatic capacitance of the capacitor inserted between the defroster heater wires 5 and the radio receiver, and the insertion loss due to the capacitor, at a frequency of about 1 MHz in an AM broadcast band. The horizontal axis of the graph of FIG. 12 represents the electrostatic capacitance, and the vertical axis the insertion loss. FIG. 12 indicates that if the electrostatic capacitance of the capacitor is about 120 pF or greater, then any insertion loss can be ignored in the AM broadcast band.

Figure 13:
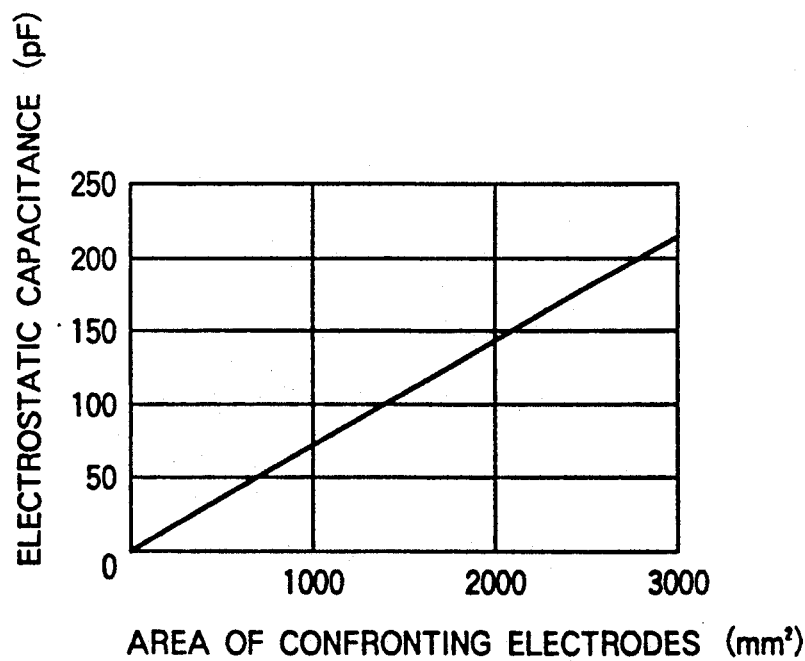
FIG. 13 is a graph showing the relationship between the area of confronting electrodes on opposite surfaces of a glass panel and the electrostatic capacitance between the electrodes.

FIG. 13 is a graph showing the relationship between the area of confronting electrodes on opposite surfaces of a glass panel and the electrostatic capacitance between the electrodes, the glass panel having a thickness of 2 mm. The horizontal axis of the graph represents the area of confronting electrodes, and the vertical axis the electrostatic capacitance between the electrodes. It can be seen from FIG. 13 that in order to achieve an electrostatic capacitance of at least 120 pF for substantially eliminating the insertion loss in the AM broadcast band, the area of confronting electrodes on the glass panel which is 2 mm thick should be 1700 $mm^2$ or greater.

Figure 14:
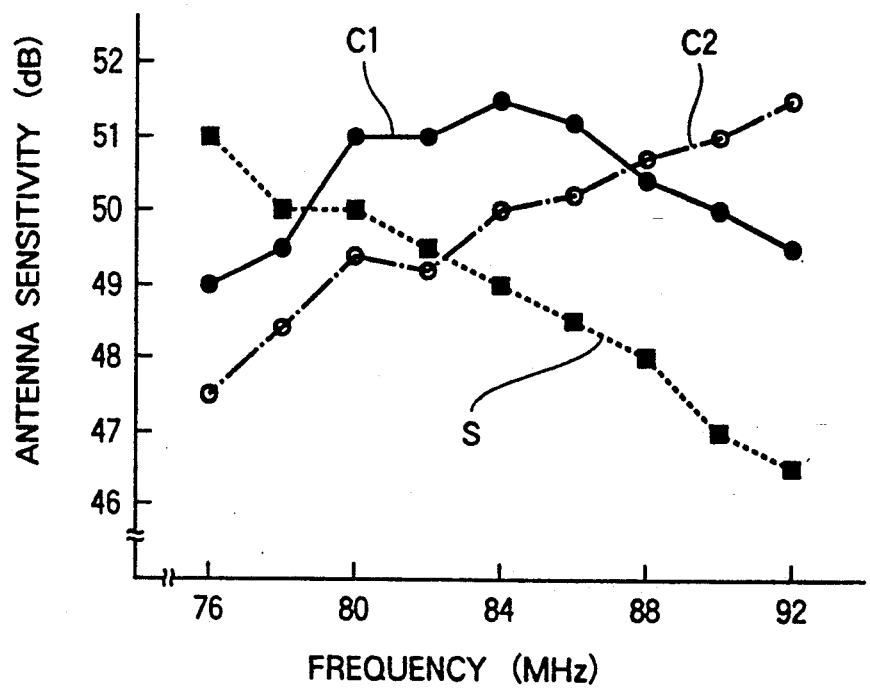
FIG. 14 is a graph showing antenna sensitivities for an FM broadcast band.

FIG. 14 shows sensitivities of window glass antennas for an FM broadcast band. The graph of FIG. 14 has a horizontal axis indicating frequencies and a vertical axis antenna sensitivities.

To obtain the results shown in FIG. 14, the window glass antenna 21 shown in FIGS. 7 through 11 was used as a sample, and measured for antenna sensitivities in an electric field of 60 dB$\mu$V/m. The window glass antenna 21 which was tested had the following dimensions:

As shown in FIG. 10, the bus bar 26 (the first electrode of the capacitor) had a length of 300 mm and a width of 10 mm.

As shown in FIG. 11, the electrode 24 (the second electrode of the capacitor) had a length of 300 mm and a width of 10 mm.

As shown in FIGS. 10 and 11, the bus bar 26 and the electrode 24 were spaced inwardly from the right edge of the window glass panel by a distance of 20 mm.

The window glass antenna 21 had 60 parallel defroster heater wires 5 as antenna elements spaced at intervals of 5 mm. The bus bars 25, 26 were spaced from each other by a distance of about 1200 mm.

In FIG. 14, a characteristic curve S is indicative of antenna sensitivities at different frequencies when received radio signals were directly supplied from the bus bar 26. Therefore, the characteristic curve S represents characteristics of a conventional window glass antenna device. A characteristic curve C1 is indicative of antenna sensitivities at different frequencies when received radio signals were supplied from the window glass antenna device 21 with the dimensions described above. Study of the characteristic curve C1 shows that the received radio signals can be detected highly efficiently by the window glass antenna device 21 without the use of a discrete capacitor.

FIG. 14 also shows a characteristic curve C2 which indicates antenna sensitivities at different frequencies when received radio signals were supplied from a window glass antenna device whose bus bar 26 had the dimensions shown in FIG. 10 and whose electrode 24 had a length of 100 mm, i.e., was 100 mm shorter at each of upper and lower ends than the electrode 24 shown in FIG. 11.

It can be understood that the antenna sensitivities may be varied by adjusting the configuration of the electrode 24. Therefore, desired frequency characteristics can be achieved without modifying the structure of the defroster heater wires 5 and the bus bars 25, 26.

While the defroster heater wires 5 are shown as being straight in the illustrated embodiments, they may be of an undulated shape so that they have an increased antenna length.

The electrodes which jointly serve as a capacitor with the glass as a dielectric may comprise transparent electrically conductive films.

Since the window glass antenna device according to the present invention has a built-in DC blocking capacitor, it is not required to have a discrete capacitor for blocking a heater current.

The defroster heater wires 5 are of a small diameter less than 0.1 mm. Therefore, many defroster heater wires 5 can be positioned in a unit width, resulting in an increase in the total effective length of the antenna elements even where the window glass area available for antenna installation remains the same.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed:

1. A window glass antenna device electrically connected both to a power supply and to a radio receiver, comprising:
    a laminated window glass panel having layers with opposite sides;
    a plurality of defroster heater wires disposed between said layers;
    means for connecting said defroster heater wires to said power supply; and
    a capacitor electrically connected to said defroster heater wires and said radio receiver, said capacitor including a bus bar interconnecting said wires on one side of one of said layers of said glass panel and an electrode on an opposite side of said one of said layers, said electrode being disposed in an aligned, confronting relationship to said bus bar.

2. A window glass antenna device according to claim 1, wherein each of said defroster heater wires has a diameter less than 0.1 mm.

3. A window glass antenna device according to claim 2, wherein each of said defroster heater wires has a diameter ranging from 0.04 to 0.05 mm.

4. A window glass antenna device according to claim 1, wherein said bus bar comprises a pair of copper foil layers disposed between said glass layers, ends of said defroster heater wires being sandwiched between said copper foil layers.

5. A window glass antenna device according to claim 4, further comprising an intermediate film disposed on a surface of said one of the glass layers.

6. A window glass antenna device according to claim 1, further comprising another bus bar disposed on said one side of said layer, said glass layers being bonded to each other, said another bus bar comprising a pair of copper foil layers disposed between said glass layers, ends of said defroster heater wires being sandwiched between said copper foil layers.

7. A window glass antenna device according to claim 6, further comprising an intermediate film disposed on a surface of said one of the glass layers.

8. A window glass antenna device comprising:
a laminated window glass panel including a pair of glass layers having facing sides, said layers being bonded to each other;
a plurality of defroster heater wires disposed between said glass layers and having first and second ends;
first and second spaced bus bars disposed between said glass layers, said first bar electrically interconnecting said first ends of the defroster heater wires and said second bus bar electrically interconnecting said second ends of the defroster heater wires;
a first electrode disposed on a non-facing side of one of said glass layers and joined to the second bus bar for supplying electric energy to heat said defroster heater wires; and
a second electrode disposed on the non-facing side of said one of the glass layers mechanically unconnected and in confronting relationship to one of the first and second bus bars;
said one of the bus bars and said second electrode jointly providing a capacitive effect for supplying a radio signal received by said defroster heater wires.

9. A window glass antenna device according to claim 8, further comprising a third electrode disposed on said non-facing side of said one of the glass layers and joined to said first bus bar for supplying electric energy to heat said defroster heater wires.

10. A window glass antenna device according to claim 9, wherein each of said defroster heater wires has a diameter less than 0.1 mm.

11. A window glass antenna device according to claim 10, wherein each of said defroster heater wires has a diameter ranging from 0.04 to 0.05 mm.

12. A window glass antenna device according to claim 9, wherein each of said bus bars comprises a pair of copper foil layers disposed between said glass layers, said first and second ends of said defroster heater wires being sandwiched between said copper foil layers of said bus bars.

13. A window glass antenna device according to claim 9, further comprising an intermediate film disposed on a facing side of one of the glass layers.

* * * * *